United States Patent [19]

Schaefer

[11] Patent Number: 5,056,467
[45] Date of Patent: Oct. 15, 1991

[54] SWINGING FEEDER FOR LIVESTOCK WITH INSECTICIDE APPLICATION APPARATUS

[76] Inventor: Alan Schaefer, Rte. Two, Ste. Genevieve, Mo. 63670

[21] Appl. No.: 598,929

[22] Filed: Oct. 17, 1990

[51] Int. Cl.$^5$ .................. A61D 7/00; A01K 29/00
[52] U.S. Cl. ....................... 119/159; 119/157
[58] Field of Search ............... 119/157, 159, 72, 61

[56] References Cited

U.S. PATENT DOCUMENTS

| | | | |
|---|---|---|---|
| 1,800,602 | 4/1931 | Cole | 119/157 |
| 2,273,616 | 2/1942 | Beatty | 119/157 |
| 2,796,848 | 6/1957 | Zimmerman | 119/72 |
| 2,925,065 | 2/1960 | Worden | 119/157 |
| 3,157,722 | 6/1965 | Gilmore et al. | 119/157 |
| 3,675,627 | 7/1972 | Myers | 119/72 |
| 3,870,023 | 3/1975 | Wilson | 119/159 |
| 4,324,202 | 4/1982 | Stonestreet et al. | 119/157 |
| 4,362,126 | 12/1982 | Ellerstorfer et al. | 119/159 |
| 4,459,942 | 7/1984 | Cauthron | 119/159 |
| 4,476,809 | 10/1984 | Bunger | 119/159 |
| 4,535,726 | 8/1985 | Cauthron | 119/159 |
| 4,567,856 | 2/1986 | Sorenson | 119/159 |
| 4,580,529 | 4/1986 | Wilson | 119/159 |

*Primary Examiner*—Paul J. Hirsch
*Attorney, Agent, or Firm*—Gravely, Lieder & Woodruff

[57] ABSTRACT

An animal operated insecticide spray delivery system operably enclosed in a barrel housing having an access opening to a feed source inside the barrel. The barrel is suspended in space such that the animal must thrust the head into the access opening to operate the spray delivery system. Should an animal butt the barrel, it will simply swing out of the way and in doing that it will lift which is not the habit of an animal to lift its head.

8 Claims, 4 Drawing Sheets

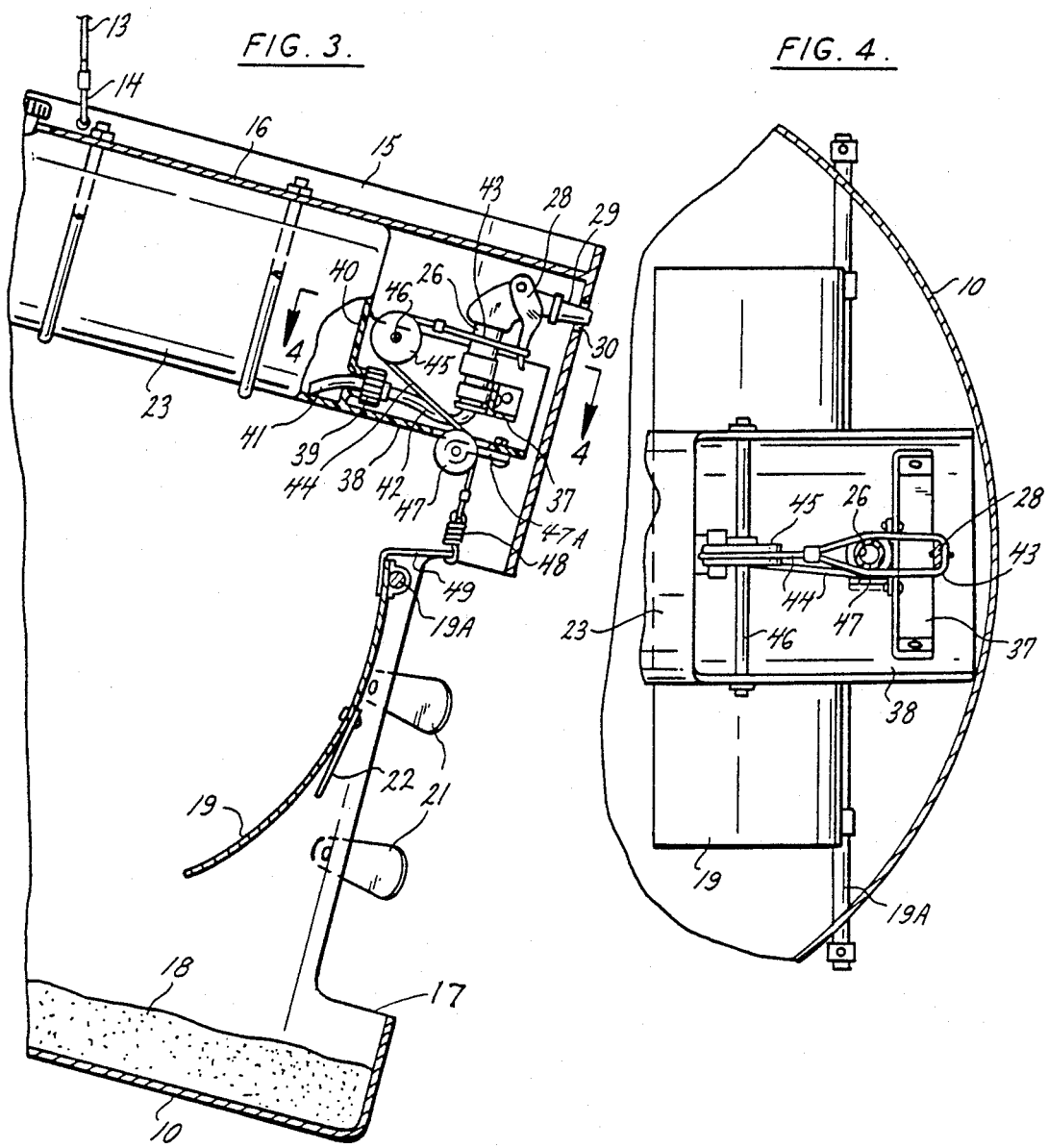
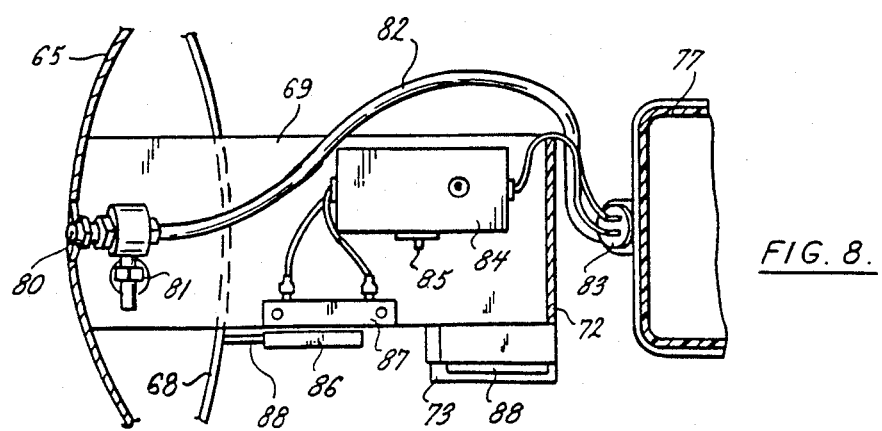

SWINGING FEEDER FOR LIVESTOCK WITH INSECTICIDE APPLICATION APPARATUS

BACKGROUND OF THE INVENTION

1. Field of the Invention

The present invention is directed to swinging feeder apparatus for delivering an insecticide upon livestock by the self operation of such feeding apparatus by livestock when seeking the contents of the apparatus.

2. Description of Prior Art

Various type of animal actuated spray delivery apparatus have come into existence wherein a fixed type of structure is formed to deliver the spray by some physical act on the part of the animal. In those types of apparatus especially adapted for cattle, the construction has generally required sturdy apparatus because of the size of cattle and the rough treatment given to the apparatus. In many cases, a treadle is provided for the cattle to step on to actuate the insecticide spray delivery mechanism. For a treadle to be effective, the apparatus must be stationary and strongly constructed.

BRIEF DESCRIPTION OF THE INVENTION

The problems that are generally found with stationary livestock or animal spray apparatus are overcome by the provision of a hanging feeder barrel of light weight construction provided with suitable means for supporting an insecticide application system in any position of the barrel that is comfortable for the animal.

The objects of the invention are directed to a hanging feeder that is not easily damaged if butted, one that is easy for cattle to learn to use, and one that is adaptable to several types of spray delivery mechanisms.

DETAILED DESCRIPTION OF THE DRAWING

The subject matter of this invention is seen in several embodiments in the drawings, wherein:

FIG. 3 is a fragmentary sectional view of a feed barrel equipped with a further embodiment of the invention;

FIG. 4 is a fragmentary top plan view of the embodiment of FIG. 3;

FIG. 8 is a plan view of the assembly seen along line 8—8 in FIG. 7.

DETAILED DESCRIPTION OF THE EMBODIMENTS

Figures 1, 5:
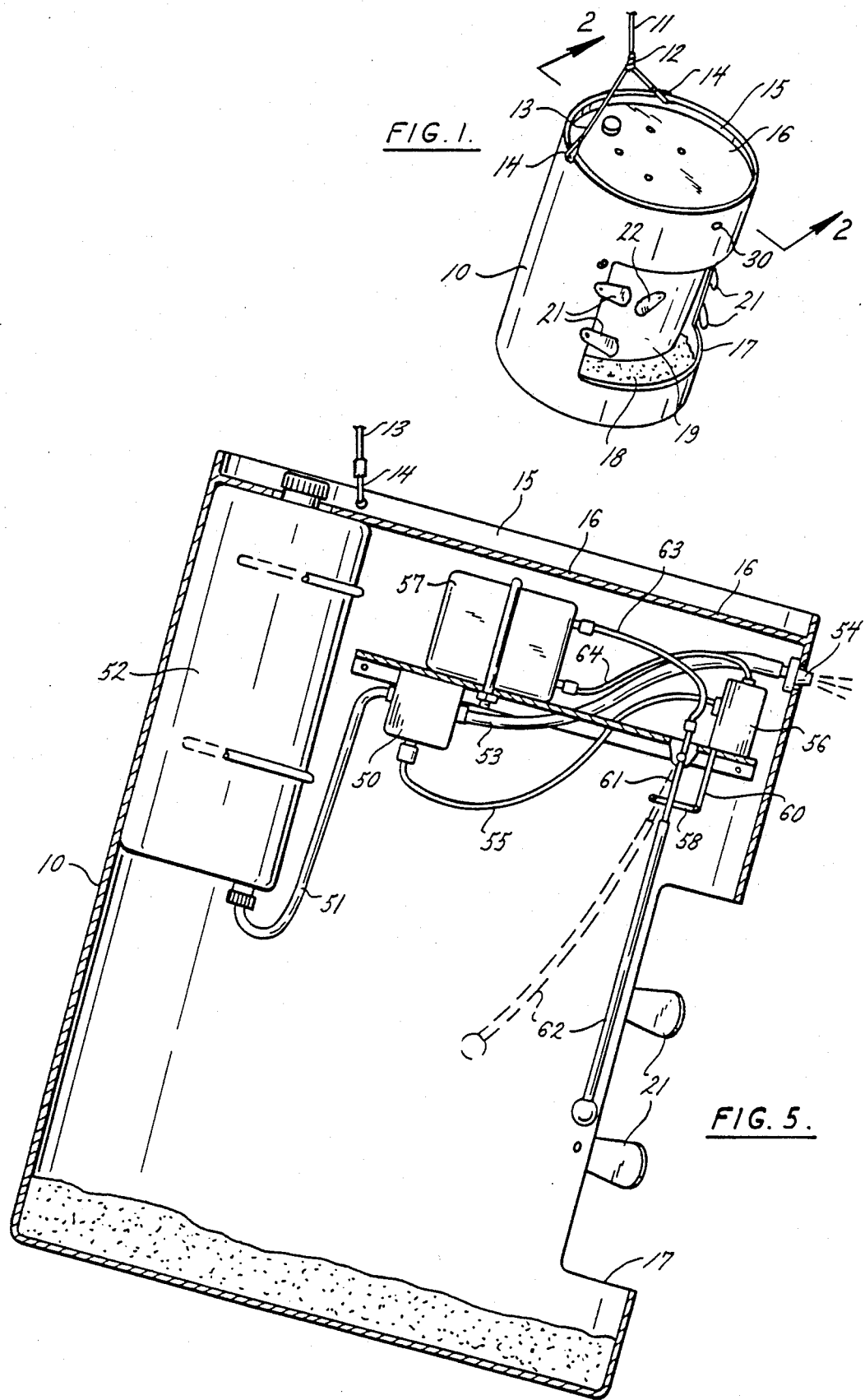
FIG. 1 is a perspective view of a feed barrel in a suspended off the ground position which is typical of the manner of support of any of the embodiments.
FIG. 5 is a sectional view of a feed barrel equipped with another embodiment of the invention.

The general mounting of a feed barrel to attract animals, preferably cattle, is seen in FIG. 1. The barrel 10 is suspended from a tree limb or other support (not necessary to show) by a cable or rope 11 having a centering means 12 that allows the branch lines 13 and 14 to have the ends run through openings drilled in the barrel flange 15 and knotted for retention. The holes in the flange 15 are aligned on a chord dimension of the barrel so the barrel top surface 16 is on a slant for the purposes of allowing the barrel 10 to slant so the opening 17 will have some protection from rain or wind or both. A supply of material such as a salt lick, feed material or similar material 18 is deposited in the bottom of the barrel, and a hinged door 19 is suspended in that opening 17.

Figure 2:
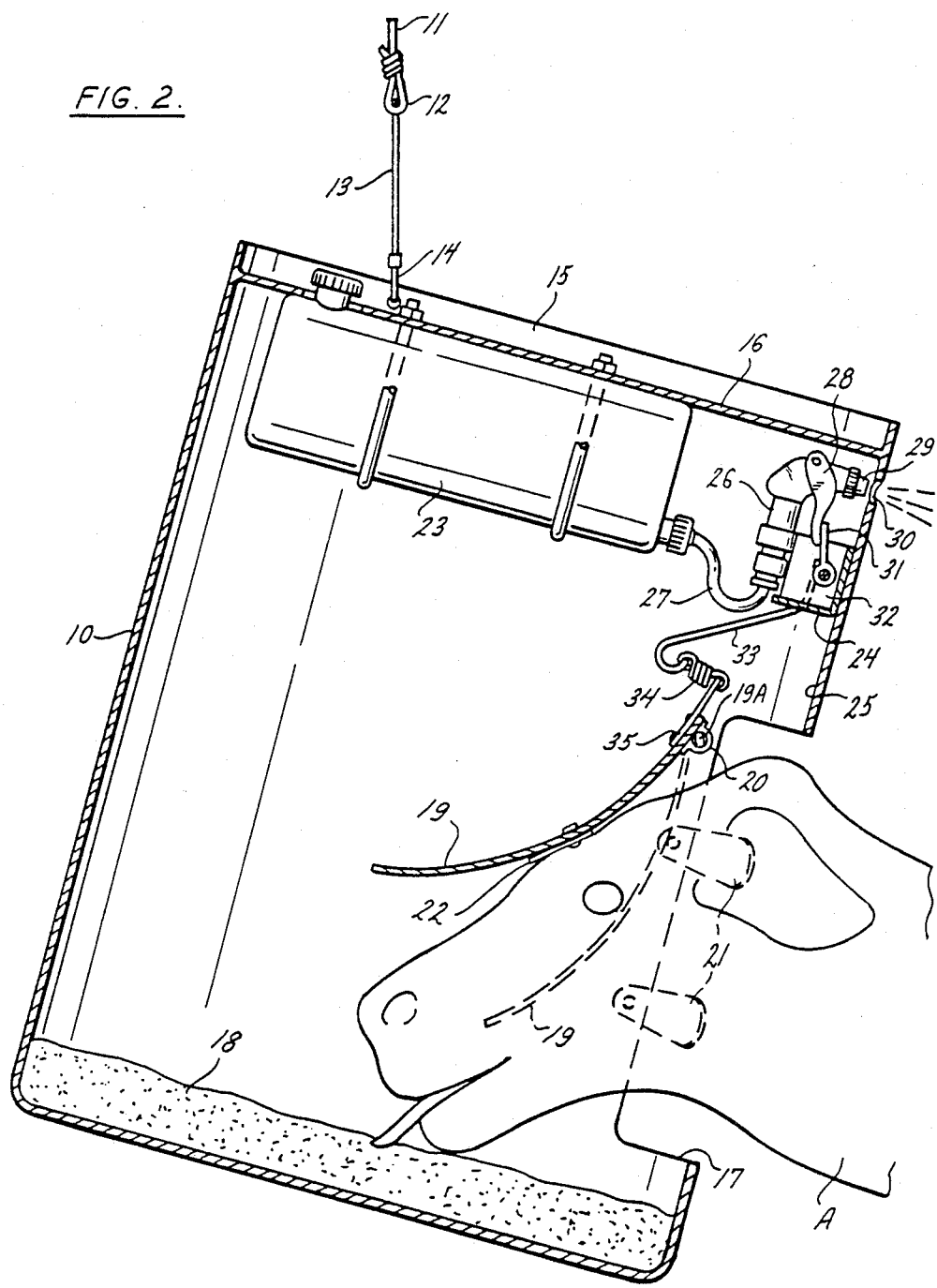
FIG. 2 is an enlarged and sectional view of the feed barrel and one embodiment of the apparatus seen along line 2—2 in FIG. 1.

Looking at FIG. 2, the door 19 is that portion of the side of the barrel that is cut out to form the opening 17. The door 19 is provided with a pivot bracket 20 placed near the center of a support rod 19A, which rod is extended transversely of the barrel and near the top of the opening 17. The head of an animal A serves to push the door 17 inwardly so the feed 18 is accessible. As the head enters the opening 17, side tabs 21 and a central tab 22 brush against the animals head to apply an insecticide preparation.

The applicator system of FIG. 2 comprises a reservoir 23 for liquid insecticide, a bracket 24 fastened to the inside 25 of the barrel wall. The bracket 24 supports a pump body 26 having a supply conduit 27 connected between the body 26 and the reservoir 23. The pump has an actuating lever 28 adjacent the nozzle 29, and the nozzle 29 is pointed to an opening 30 in the barrel side wall. The pump lever 28 is engaged by an actuator lever 31 mounted on the base 32 of the pump body 26. That lever 31 is actuated by a suitable cable 33 extending from the lever 31 to a spring element 34 carried on a bracket 35 attached to the door 19. The animal actuates the pump 26 each time the door 19 is pushed into its open position. When the animal withdraws its head, the door 19 will swing to close opening 17 and the pump lever 31 is released.

The embodiment seen in FIGS. 3 and 4 is carried in the barrel 10 having the opening 17, and a reservoir 23 for the insecticide. The door 19 is provided with an applicator 22, and each side of opening 17 is provided with applicators 21, the purpose of which is to brush over the head of an animal as it enters the opening to obtain the material supply. In this embodiment the pump body 26 is mounted on a support bracket 37 so the nozzle 29 is positioned at the barrel opening 30. The support 37 is carried by a shelf 38 so that a hose connector 39 at the back wall 40 of the shelf effects a connection between a reservoir hose 41 and a delivery hose 42 connected into the pump 26.

The pump 26 of FIG. 3 is actuated by the pump lever 28, and that lever 28 is received (FIG. 4) in a pull-loop 43 of a pull cable 44. The cable 44 is trained over a pulley 45 mounted on a shaft 46 in the shelf 38, and extends to a second pulley 47 fastened to the shelf 38 by a bracket 47A. The pull cable 44 extends from the pulley 47 to connect to a spring 48 that is attached to an actuator arm 49 at the upper end of the door 19 adjacent its pivot shaft 19A. The door is sufficiently heavy to tend to move to a hanging attitude in the door opening 17, and this allows the arm 49 to move in a counter-clockwise direction and relieve any tension in the pull cable 44. When an animal pushes against the door 19, the arm 49 pulls down on the spring 48 and cable 44 which results in actuation of the pump lever 28 to deliver a spray on the animal while its head is in the barrel.

A further embodiment is seen in FIG. 5 in which the spray mechanism in the barrel 10 is modified relative to the mechanical operating provision for the embodiments in FIGS. 2 and 3. The modification comprises an electrical actuation arrangement in which a motor operated pump 50 is connected into a hose 51 from the reservoir 52, and has an outlet hose 53 connected into a spray nozzle 54. The pump 50 is supplied with a current from lead 55 which extends from a control box 56. A battery 57 furnishes the power for the pump motor through a normally open contact ring 58 in one electrical lead 60 to the control box. The contact that occurs between the ring 58 and the bare section 61 of the pendent actuator 62 completes one side of the connection from the battery 57 at lead 63. The other side of the battery 57 is the lead 64 to the control box 56. The control box 56 contains a known type of timer and reset mechanism so that a predetermined amount of spray will be dispersed at the nozzle 54 and then will shut off the pump until the system is cycled again. The cycling of the system is responsive to an animal pushing on the actuator 62 from the full line to the dotted line position. This serves to make the circuit at the ring 58 and wire 61, as explained above. More specifically, when the actuator 62 is moved to contact the ring 58 the current from the battery 57 will energize a timer to power up the pump 50 for a short time of from 1.5 to 2.5 seconds for delivery of a spray. The expiration of the selected period of time will open the pump circuit and it will require response of another animal moving the actuator 62 to recycle the spray time.

Figures 6, 7:
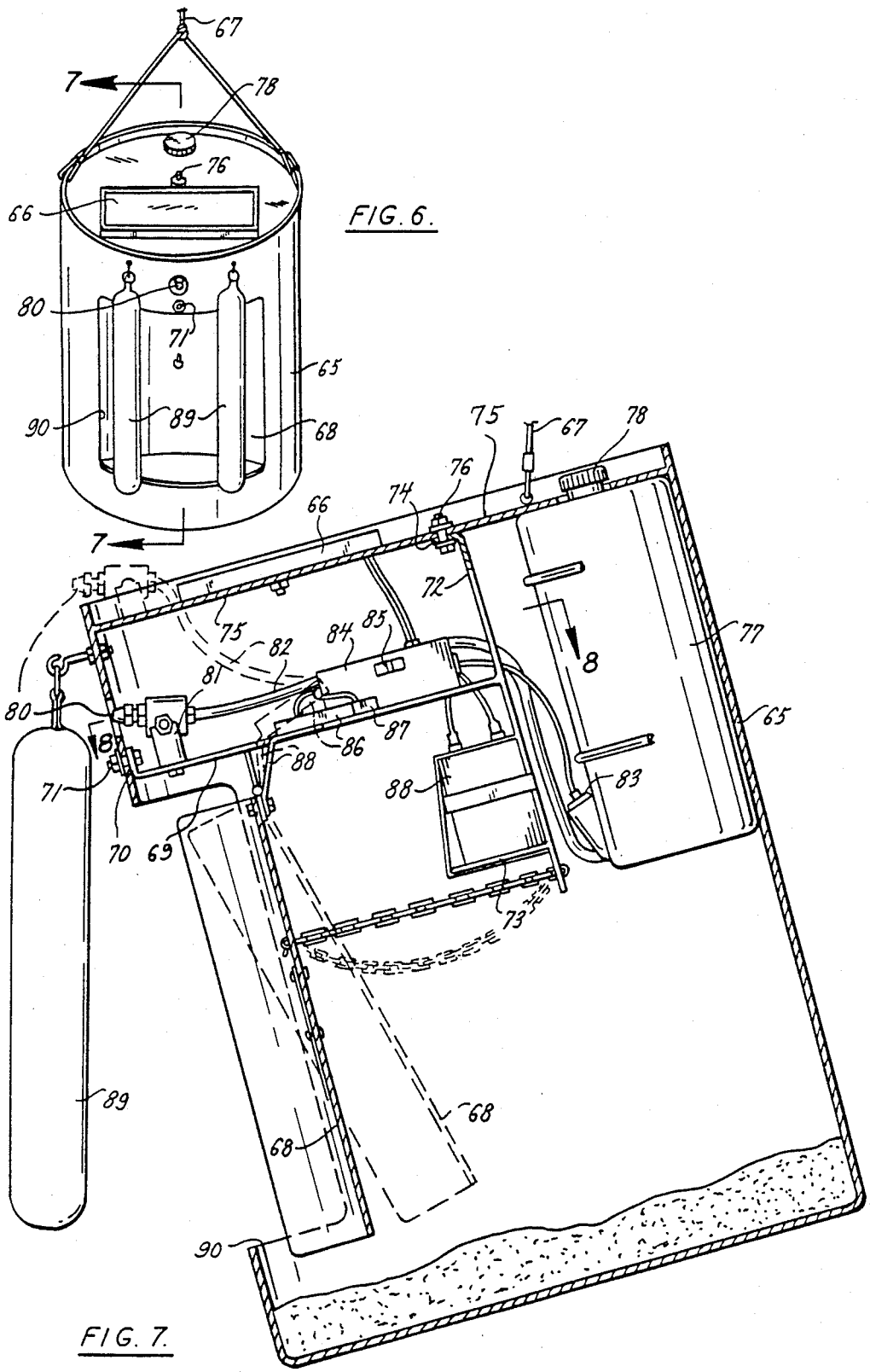
FIG. 6 is a perspective view of a further embodiment of the inventions.
FIG. 7 is an enlarged sectional view to illustrate details of the embodiment seen along line 7—7 in FIG. 6.

A further embodiment of the invention is shown in FIGS. 6–8 wherein a suspended barrel 65 is equipped with a solar panel 66 for charging a battery to be referred to presently. The barrel 65 is suspended by a suitable rope or cable 67 so it is free to swing. There is a door 68 pivotally suspended by a hinge attached to a supporting frame comprising a platform 69 having a flange 70 to receive a bolt 71 mounted in the front wall of the barrel 65 over the door 68. The platform 69 has its inner end attached to a hanging bracket 72 formed with a shelf 73 that extends down under the platform 69. The bracket 72 extends to a flange 74 under the top cover or end 75 of the barrel 65 where a securing bolt 76 is located to hold the hanger in position. The interior of the barrel 65 carries an insecticide supply tank 77 positioned along side the bracket 72 so its filling cap 78 can extend above the barrel top 75.

Turning now to FIGS. 7 and 8, the operational components for this embodiment comprise a spray nozzle 80 mounted on the platform 69 by an adjustable support 81 so it can direct a spray of insecticide through a suitable port 81 in the barrel wall onto an animal that has actuated the door 68. A supply conduit 82 for the nozzle 80 is connected to an electric pump 83 mounted in the lower end of the tank 77. There is a control unit 84 containing a timing circuit of known character for determining the sequence of the duration of the spray delivery and the period of non-delivery as well as rearming the delivery sequence. The duration of the timing circuit is from about two seconds to about five seconds by a control switch 85. The timing circuit in unit 84 is responsive to the control switch 85 and to a magnetic actuator 86 for energizing an on-off switch 87 which is subject to the opening movement and closing movement of the door 68. The nozzle 80 can be located also on the barrel top to spray more of the animal. See the dashed outline in FIG. 7. The magnetic actuator 86 is carried by the door on an adjustable arm 88 so that when the door 68 is closed the actuator 86 is positioned alongside the switch 87 to close the timing circuit so it will time out and release the control circuit to the spray pump 83. The switch 87 may be the equivalent of an AMSECO, model 37 AMS 37 magnetic reed switch operated in response to the adjacent presence or removal of the magnetic actuator 86. The next time an animal pushes the door 68 to open position, the magnetic actuator 86 moves into the dotted position (FIG. 7) away from the switch 87 which causes the timing circuit to start the timer which times out and then energizes the pump 83 to deliver a spray at the nozzle 80. It can be appreciated that the time delay before the pump 83 is energized to deliver a spray is to accommodate the normal time it takes for an animal to stick its head into the barrel. The time delay for releasing the control circuit to the pump 83 is to allow time for a second animal to replace the first one whereby the circuit will be armed to deliver a spray onto the second animal.

The embodiment of FIGS. 6 and 7 includes the addition of suspended insecticide treated application 89 positioned in front of the opening 90 in the barrel. The door 68 is that portion of the barrel wall that is cut out of the opening 90 and turned so its concave surface faces outwardly to the animal.

The current for the timer circuit is unit 84 and to energize the pump 83 is derived from a battery 88 placed on the shelf 73. The battery 88 is charged up by the solar panel 66. With this arrangement the availability of the spray system will have a long range capability.

What is claimed is:

1. An insecticide spray applicator for suspension in space to yield to being butted by the approach of an animal, said applicator comprising:

(a) a housing forming an enclosure for animal feed to entice an animal to seek the feed in the housing;

(b) an animal access opening in said housing adjacent the location of the animal feed;

(c) a system of insecticide delivery to the animal using the housing, including a source of insecticide and spray means to deliver the insecticide upon the animal;

(d) actuator means operable at said access opening in position to be operated by an animal butting against said actuator means on seeking the feed, said actuator means upon being butted effecting operation of said insecticide spray means; and (e) means connected to said housing for suspending said housing for substantial swinging motion responsive to animal butting.

2. The insecticide spray applicator set forth in claim 1 wherein said suspending means effects tilting of said housing to position said actuator means for partial substantial closure for said access opening, said partial closure being moveable by an animal seeking the feed.

3. Apparatus for delivering an insecticide application upon an animal, said apparatus comprising:

(a) a housing carrying insecticide delivery means thereon in position to be engaged by an animal;

(b) animal attractant means carried by said housing to induce an animal to seek access to said housing;

(c) movable door means in said housing responsive to an animal thrusting its head against said door means for access to the attractant means carried by said housing; and (d) means adapted to support said housing for swinging movement to evade a butting attack of an animal on said housing.

4. In apparatus for delivering an insecticide spray upon an animal head and back, the improvement which comprises:

(a) a housing having a bottom, a top and enclosing wall means interconnecting said bottom and top, with said enclosing wall formed with an opening providing access to said housing for the head of an animal;

(b) suspending means connected to said housing top in position to allow said housing to hang with said top slanted at an angle placing said opening facing angularly down;

(c) insecticide delivery means mounted is said housing in position to deliver a spray of the insecticide upon an animal;

(d) operating means adjacent said housing opening in position to respond to an animal head entering said opening for actuating said insecticide delivery means; and (e) animal attractant means placed in said housing upon said bottom in position to be reached by an animal thrusting its head into said housing through said opening.

5. The apparatus set forth in claim 4 wherein said operating means adjacent said housing opening and said insecticide delivery means include a pull cable tensioned by said operating means operably supported at said housing opening to operate said spray.

6. The improvement set forth in claim 4 wherein said operating means for actuating said insecticide delivery means including a pull cable tensioned by said operating means to actuate said insecticide delivery means.

7. The improvement set forth in claims 4 wherein said operating means for actuating said insecticide delivery means includes a pump to deliver the insecticide spray, an electrical circuit for said pump, and control means in said electrical circuit for timing the start and duration of said spray in response to each animal using said apparatus.

8. The improvement set forth in claim 4 wherein said operating means for actuating said insecticide delivery means includes timing circuit means, a source of electrical energy, electric pump means and magnetic means responsive to movement of said operating means by an animal's head for triggering said timing circuit means to effect delivery of a spray for a predetermined time and to neutralize said timing circuit means following movement of an animal to effect spray delivery.

* * * * *